Aug. 11, 1959     F. E. PAYNE     2,899,219
ROTARY MECHANICAL SEAL

Filed Sept. 20, 1954     2 Sheets-Sheet 1

INVENTOR:
FRANK E. PAYNE
BY
Edward R. Lowndes

Aug. 11, 1959  F. E. PAYNE  2,899,219
ROTARY MECHANICAL SEAL
Filed Sept. 20, 1954  2 Sheets-Sheet 2

INVENTOR:
FRANK E. PAYNE
BY
Edward R. Lowndes

United States Patent Office 2,899,219
Patented Aug. 11, 1959

2,899,219

ROTARY MECHANICAL SEAL

Frank E. Payne, Glencoe, Ill., assignor to Crane Packing Company, Morton Grove, Ill., a corporation of Illinois Application September 20, 1954, Serial No. 457,194

2 Claims. (Cl. 286—11)

The present invention relates to improvements in shaft seals and more particularly to a rotary mechanical seal for effecting a seal against the passage of fluid between relatively movable machine parts, as for example, between a shaft and a machine casing within which the shaft is rotatably mounted. Specifically, the invention relates to that type of sealing device in which the sealing effect between the relatively moving parts occurs at radially extending surfaces and wherein a so-called running seal is effected between the moving parts.

The invention has been shown and described for purposes of illustration in connection with a water pump of the type commonly employed by the automotive industry for use in connection with automobiles, although it will be understood of course that the invention is not to be limited to this specific use. One type of seal designed for this purpose has been shown and described in the patent to Frank E. Payne, No. 2,645,508, dated July 14, 1953, for Rotary Mechanical Seal and the present invention has been designed as an improvement over this type of seal.

Seals constructed in accordance with the principles of the present invention may assume various forms and, in the forms illustrated herein, improved operating characteristics have been attained while at the same time ease of assembly of the seal has been facilitated.

In the assembly of seals of this type it is desirable that the installation be made with a minimum of effort so that the operator may devote but little time and thought to the assembly of the seal with which each pump is equipped. Such seals are a specialty and a more effective and proper assembly can be performed by the seal manufacturer at the factory than can be attained by individual installation so that thereafter the preassembled seals may be handled as complete "package-type" assemblies or units which are placed in position in the recess provided for them in the pump casing.

The present invention contemplates the provision of a novel form of clamping means whereby the inturned or flanged end of the elastomeric bellows for a seal of the above-mentioned Payne type may be preloaded upon the cylindrical wall of the retainer against dislodgement without the use of an adhesive. In one form of the invention the means for preloading the inturned flange of the bellows on the cylindrical wall of the retainer consists of a metal ferrule which surrounds a re-entrant portion of the flange and forces the same against the cylindrical wall, the ferrule itself being forced into position during assembly of the seal by the thrust exerted by the spring when the spring is compressed so that the various convolutions thereof bear against each other and the spring "goes solid."

In another form of the invention the preloading means includes a longitudinally extending thrust flange, the longitudinal extent of which is greater than the longitudinal extent of the spring when fully compressed so that this thrust flange may engage the rear end of the sealing washer and constitute a thrust member whereby the various parts of the seal assembly may be forced to their final position within the retainer and the bellows flange preloaded upon the cylindrical wall of the retainer.

In yet another form of the invention the bellows flange is maintained in firm engagement with the end wall of the retainer by a so-called staking device or ferrule having a thrust flange associated therewith of greater extent than the axial extent of the spring when fully compressed so that, during assembly operations, the thrust flange may be employed to drive the retainer or staking device to a home position wherein the bellows flange is compressed against the rear wall of the retainer. The flange is maintained in this compressed condition by virtue of a staking flange provided on the staking device which frictionally engages the cylindrical wall of the retainer and prevents backing off of the staking device.

In addition to facilitating the assembly operation, the improved seal of the present invention possesses operating advantages not present in seals of this general type. In the closed systems associated with modern automotive engines using water as a cooling medium pressures are often maintained which are considerably higher than atmospheric pressures and these pressures are of course transmitted to all parts of the cooling system including the seal. Unless the seal is properly designed, the fluid pressure within the system may tend to counteract the action of the spring which tends to hold the seal closed and this sometimes results in a sudden opening of the seal faces with a resultant loss of fluid and of pressure. According to the present invention, in one form thereof, a novel means of hydraulically balancing the seal has been attained whereby the seal will not become open regardless of the pressure of the fluid in the cooling system.

In seals of this type undue external pressures developed on the outside of the sealing bellows may cause the bellows to enter the interstices between the various spring convolutions and, not only is the bellows subject to the pinching action of the spring, but such elongation or stretching of the bellows may pull the washer away from its seat, thus opening up the seal. It may also pull the bellows flange away from the rear wall of the retainer. Conversely, where undue internal pressures are developed the same stretching action of the bellows by its outward expansion may open up the seal or withdraw the bellows flange from its nested position within the retainer. In another form of the invention these limitations are obviated and the bellows is prevented from collapsing against the spring and from being stretched outwardly to an undue extent. The means which are provided for this purpose serve to more positively hold such external and internal pressures.

The provision of a rotary mechanical seal of the character briefly outlined above and possessing the advantages briefly set forth being among the principal objects of the invention, other important objects and advantages will become more readily apparent as the nature of the invention is better understood.

In the accompanying two sheets of drawings forming a part of this specification, several preferred embodiments of the invention have been shown.

Figure 1:
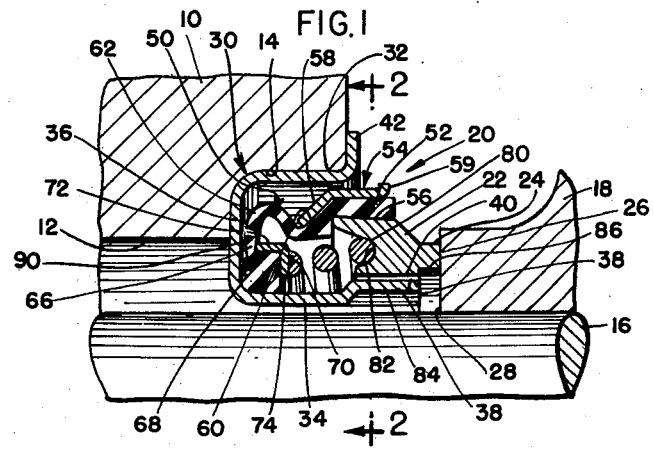
Fig. 1 is a fragmentary quarter section view taken transversely through one form of seal assembly constructed in accordance with the principles of the present invention.
Figure 2:
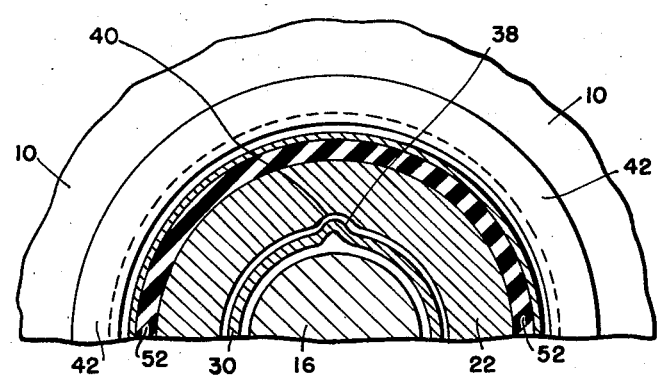
Fig. 2 is a sectional view taken substantially along the line 2—2 of Fig. 1.

Referring now to the drawings in detail and in particular to Figs. 1 and 2, one form of the seal assembly of the present invention has been shown as being applied to a pump construction including a pump housing 10 having an opening 12 formed therein provided with a counterbore 14. The pump shaft 16 extends through the opening 12 and carries the usual pump impeller 18. The seal assembly is designated in its entirety at 20 and includes a sealing washer 22 having a forwardly extending nose portion 24 on which there is formed a substantially flat annular radially disposed sealing surface 26 designed for running sealing engagement with a similarly flat sealing surface 28 provided on the hub portion of the impeller. The washer 22 may be formed of any of a number of known materials which have been proven effective as sealing elements as for example a molded thermo-setting resin having dispersed therein metal particles for better heat conductivity and good wear characteristics. The washer 22 is at least partially nested within a generally cylindrical cup-shaped retainer or shell 30 in the form of a light sheet metal stamping of one-piece construction having an outer cylindrical wall 32, an inner cylindrical wall 34, generally known as a "center post," and an interconnecting radial wall 36. The washer 22 is slidable upon the inner cylindrical wall 34 and a pair of diametrically opposed outwardly struck ribs 38 are formed on the wall 34 and extend into aligned longitudinal grooves 40 formed in the inner cylindrical bore of the washer 22. The ribs and grooves permit sliding movement of the washer on the cylindrical wall while preventing relative rotational movement between these parts.

The retainer 30 is pressed into the counterbore 14 of the housing 10 and an outwardly extending radial flange 42 formed on the retainer 30 serves to locate the latter with reference to the sealing surface 28 provided on the hub of the impeller 18.

In order to effectively seal the washer 22 with respect to the retainer 30 and consequently with respect to the housing 10, a flexible sleeve or bellows member 50 which is preferably formed of an elastomeric material such as rubber, either natural or synthetic, or a combination of the two, is provided with a forward thickened cylindrical region 52 which is telescopically received over the rear end of the washer 22 and which is clamped thereto by means of a generally cylindrical metal ferrule 54. The inside diameter of the ferrule 54 is somewhat less than the combined radial extent of the washer 22 and sleeve 50 so that the cylindrical portion 52 of the bellows may be preloaded upon the outer cylindrical surface 56 of the washer. An inclined rearwardly extending flange 58 formed on the ferrule limits the forward axial movement of the ferrule during assembly operations when the washer 22, sleeve 50 and ferrule 54 are assembled one upon another. The forward end of the ferrule 54 is flared outwardly as at 59 to guide the ferrule over the thickened portion 52 of the sleeve during such assembly operations.

The sleeve or bellows 50 is provided with an outside conical surface 60, the slope of which is substantially the same as the slope of the conical portion 58 of the ferrule 54 and the thickened portion of the bellows merges with an intermediate flexible portion 62. The rear end of the bellows 50 is turned inwardly as at 66 to provide a flange portion, the inner edge of which terminates in a re-entrant thickened portion 68. In order that the seal shall function properly, it is necessary that the re-entrant thickened portion 68 of the bellows member 50 be held firmly against the inner face of the radial end wall 36 of the retainer 30 and, heretofore in seals of this general nature, adherence of the inturned flange of the bellows member has been effected by means of a suitable adhesive. In the present instance however, this adherence is maintained by preloading the thickened portion 68 upon the retainer center post 34. Toward this end a metal band or ferrule 70 which is L-shaped in cross section has a cylindrical flange 72 which surrounds the thickened portion 68 and a radial flange 74 which bears against the forward face of the portion 68. The diameter of the ferrule is such that when the same is in position over the thickened portion 68, the latter is compressed between the cylindrical wall 72 of the ferrule and the cylindrical wall 34 of the retainer thus compressing the thickened portion on the latter cylindrical wall. A coil spring 80 which may be of slight conical configuration bears at one end against the radial flange 74 of the ferrule 70 and the other end of the spring is seated within a recess 82 provided in the rear face of the washer 22. The recess 82 is comparatively deep and allows the use of a spring 80 which is comparatively long and which therefore has an effective sealing action on the washer 22. The central opening provided in the ring member 70 is of a diameter sufficiently great to enable the ring member to pass over the driving ribs 38 on the center post 34 during initial assembly operations.

Still referring to Fig. 1, the bellows member 50 is molded so as to provide a slight clearance as shown at 90 on the rear side of the bellows between the radial retainer wall 36 and bellows, this clearance being provided for the purpose of establishing a hydraulic balance on the opposite sides of the bellows. In Fig. 1 the seal is shown in its installed position with the bellows shown in the position it will assume before any fluid pressure is applied exteriorly thereof. While the exact shape that the bellows will assume when pressure is exerted upon it from the outside cannot be ascertained, it is known of course that such pressure will tend to collapse the bellows inwardly to a certain extent depending upon the amount of pressure in the fluid to be sealed. Without the provision of the recess 90 it may be observed that any tendency for the bellows to collapse will blow the bellows, so to speak, inwardly so that it will hug the convolutions of the spring 80 thus stretching the bellows and when the pressure is sufficiently high, this stretching of the bellows may have the effect of opening up the two seal surfaces 26 and 28 by virtue of the washer 22 being drawn rearwardly under the stretching action of the bellows. Where the recess 90 is provided however a hydraulic balance is obtained whereby fluid pressure may pass around the rear end of the bellows and move the same forwardly thus effectively increasing the length of the flexible portion of the bellows so that upon inward movement thereof ample material is supplied and there will be no tendency for the material to stretch and pull the washer 22 away from the seat 18. This clearance 90 at the rear end of the bellows constitutes one of the important features of the present invention.

Figure 3:
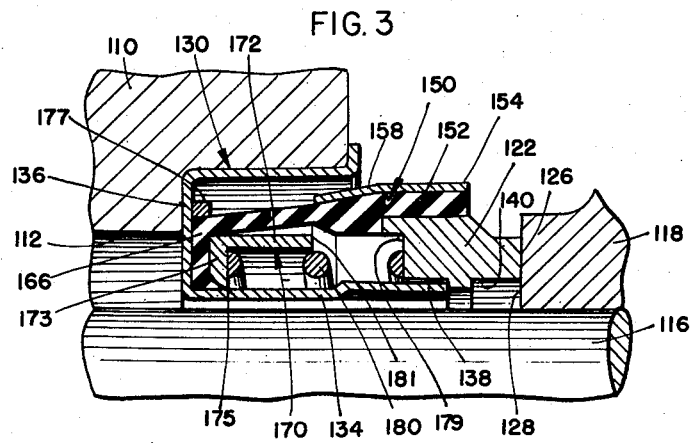
Figs. 3, 4 and 5 are quarter section views similar to Fig. 1 showing respectively three modified forms of seal assembly.

In Fig. 3 a somewhat modified form of the invention has been shown. In this form of the invention the general overall shape characteristics of the seal of Fig. 1 have been preserved and in order to save needless repetition of description, similar characters of reference have been applied to the corresponding parts of the seal and its assembly such as the shaft 116, casing 110, opening 112, washer 122, impeller 118, bellows member 150, ferrule 154 with its inclined portion 158, spring 180 and drive connections 138, 140. In this form of the invention, as in the form of the invention shown in Fig. 1, the forward thickened portion 152 is compressed between the metal ferrule 154 and outer cylindrical surface of the washer 122. The inturned flange 166 of the bellows at the rear end of the latter is compressed against the wall 136 of the retainer 130 by virtue of a staking device or ring 170 which surrounds the center post 134 and is provided with a generally cylindrical flange 172 which constitutes an armor for the spring 180 and a vertical flange 173 which constitutes a staking flange as will be described presently.

For proper seal operation, the flange 166 must be firmly held against the inner face of the radial end wall 136 of the retainer 130. Heretofore adherence between these two parts of seals of this type has been effected by means of a suitable adhesive or cement which is applied to the inner face of the radial wall 136 prior to assembly operations. However, in the present instance, this adherence is maintained by firmly clamping the radial flange 166 against the wall 136 by means of the armor and staking ring 170. The ring 170 is preferably formed of spring steel and the radial wall 173 may be, but is not necessarily, slightly conical and has a sharp forward inner circular edge 175. The diameter of the edge 175 is substantially equal to or slightly less than the inner diameter of the center post 134 so that there is practically no play between these two parts. Thus when the ring 170 is inserted over the center post 134 and driven to the left, the flange 166 of the bellows 130 will be compressed as shown from its normal position and the retainer 170 will be prevented from moving forwardly by virtue of the sharp circular edge 175 which digs into the metal of the center post as shown, thus retaining the flange 166 in position by a strong wedging action. In order to further guard against dislodgement of the flange 166 from its position behind the staking flange 173, a metal clamping ring 177 surrounds the flange 166 and assumes a position in contact with the radial wall 136.

Figure 6:
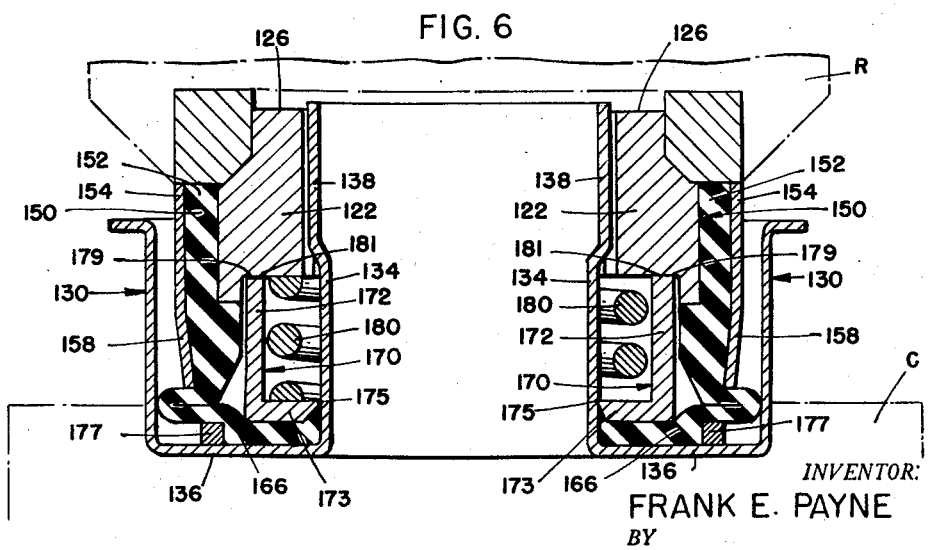
Fig. 6 is a fragmentary sectional view somewhat schematic in its representation showing the manner in which the seal of Fig. 3 may be assembled in an automatic assembly mechanism.

The cylindrical flange 172 of the retainer 170 serves the dual function of forming an armored protection against inward movement of the flexible portion of the bellows 150 and it also serves as a thrust flange by means of which the retainer 170 as a whole may be driven to its home position during initial assembly operations upon the seal. Toward these ends the longitudinal extent of the flange 172 is such that it is substantially coextensive with the flexible intermediate portion of the bellows 150 as well as being somewhat greater than the combined longitudinal thickness of the various spring convolutions when the spring is compressed to its solid state. This seal is thus rendered readily susceptible to automatic assembly operations utilizing an assembly conveyor wherein the washer 122, bellows 150 and ferrule 154 are assembled upon each other to constitute a sub-assembly which is then slipped over the center post 134 preparatory to a pressing operation wherein the washer 122 is forced rearwardly toward the retainer end wall 136. Such rearward movement of the washer 122 during assembly operations causes the spring 180 to become partially compressed until such time as the radial rear face 179 of the washer 122 engages the forward rim 181 of the ring 170 and drives the ring to its home position. In Fig. 6, this engagement between the washer 122 and retaining ring 170 during actual assembly operations has been illustrated. In this view a retaining cup for the retainer 130 has been shown in dotted lines at C and the pressing tool or ram has similarly been shown in dotted lines at R. Upon release of pressure by the ram R, the sharp edge 175 of the substantially radial flange 173 which engages the center post 134 prevents forward movement of the retainer 170 along the center post 134.

The cylindrical thrust flange 172 (Fig. 3) in addition to serving its function as a thrust member in the seal assembly operations also constitutes a protective armor for the intermediate flexible portion of the bellows 150 to prevent the bellows from being blown inwardly when high pressures are encountered. When such pressures are developed, the flexible portion of the bellows will bear against the thrust flange 172 so that the bellows will not be unduly stretched to such an extent that the washer 122 is placed under tension and is subject to the pulling forces of the bellows tending to open up the sealing surfaces 126 and 128.

Figure 4:
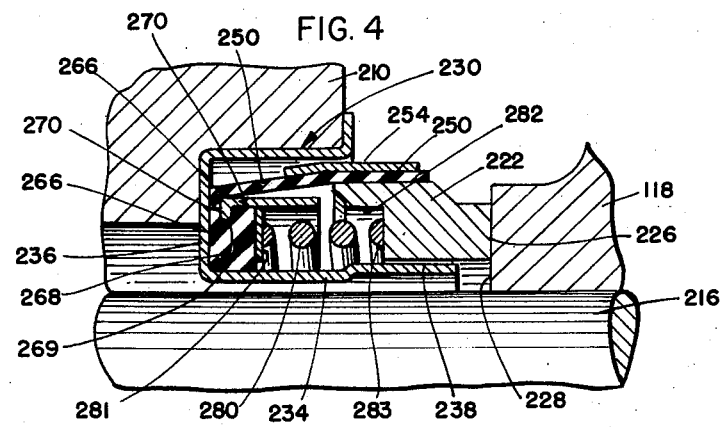

Referring now to Fig. 4 wherein a still further modified form of the invention is concerned, again similar characters of reference have been applied to those corresponding parts of the seal assembly when considered in connection with Fig. 1. In this form of the invention the shaft 216, pump casing 210, washer 222, bellows 250, ferrule 254, spring 280, and retainer 230 with its driving dents 238 in a general way are similar to those previously described in connection with Figs. 1 and 3. However, in this form of the invention the inturned flange 266 of the bellows 250 has a thickened re-entrant portion 268 having a shallow cylindrical groove 269 molded therein designed for reception of an inturned rib 271 provided on a combined armor and thrust ring 270 having a cylindrical wall 272. The spring 280 applies pressure at one end through a pressure ring 281 to the re-entrant thickened portion 266 and at the other end it bears against a radial surface 283 provided at the bottom of a rearwardly facing recess 282 formed in the washer 222. The recess 282 is sufficiently deep as to enable the spring 280 to be made of sufficient length as to effectively perform its sealing action between the seal surfaces 226 and 228. The internal diameter of the ring 270 is less than the overall diameter of the thickened portion 268 of the bellows 250 so that the rear end of the bellows is compressed upon the center post 234.

As is the case in connection with the assembly of the seal of Fig. 3, the wall 272 of the sealing ring 270 constitutes a thrust member designed for engagement with the rear face of the washer 222 during assembly operations as well as constituting an effective armor against inward collapsing of the bellows 250 when high external pressures are encountered. The groove 269 and rib 271 cooperate to prevent forward movement of the ring 270 after assembly pressure has been relieved. This groove and rib also to a certain extent prevent pulling of the thickened preloading portion 268 from its final installed position on the center post 234 when the sub-assembly including the washer 222, bellows 250 and ferrule 254 are forceably pulled forwardly.

Figure 5:
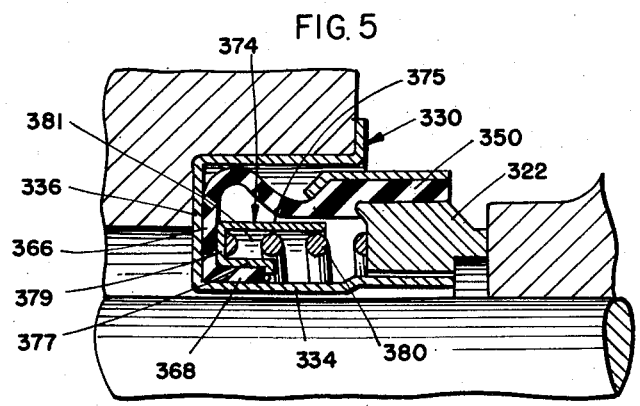

Again, in the form of the invention shown in Fig. 5, similar reference numerals have been employed to designate those parts which correspond to the parts of the seal shown in Fig. 1. In this form of the invention the inturned flange 366 has a lateral re-entrant portion 368 which may be of substantially the same thickness as the flange 366 and this former portion 368 is preloaded upon the center post 334 of the retainer 330 by means of a ring 370 having an irregular but rectilinear cross sectional shape. The ring 370 is provided with an outer cylindrical portion 372 which encircles the spring 380 and an inner cylindrical portion 377 which encircles the flange 368 and serves to preload the latter upon the center post 334. A connecting wall 379 extends between the portions 372 and 377 and bears against the inturned flange 366 of the bellows member 350 under the influence of the spring 380 and serves to clamp or press the flange 366 firmly against the rear wall 336 of the retainer. A cylindrical trough portion 381 provided by the three walls 372, 377, and 379 provides a seat for the spring 380. A radial flange 374 on the ring 370 bears against the end of the bellows flange 368. The cylindrical wall 372, in addition to constituting a thrust flange designed for engagement with the washer 322 during assembly operations, also serves as an armor to prevent inward collapsing of the medial portion of the bellows 350 in a manner and for a purpose previously described in connection with Figs. 3 and 4.

It will be understood that the manner of assembling each of the seal assemblies shown in Figs. 1 through 5 inclusive will be substantially the same and that in the case of the seals shown in Figs. 3, 4 and 5, the thrust member 172, 272, or 372 as the case may be, will serve as a reaction member to take the thrust of the washer when the latter is driven rearwardly during assembly operations so that the inturned end of the bellows member may be forceably positioned against the rear end of the retainer shell. In Figs. 1, 4 and 5, the preloading of the re-entrant portion 68, 268 or 368, as the case may be, on the central post will prevent pulling of the seal subassembly from the retainer. In the case of the seal shown in Fig. 3, the staking flange 173 serves this retaining function.

In compliance with Title 35, U.S. Code, Section 112, preferred forms of the invention have been shown in the drawings and will be described herein, but it should be understood that the invention is not limited to the specific disclosure made, and that the appended claims should be construed as broadly as the prior art will permit.

What I claim and desire to secure by Letters Patent is:

1. A seal for relatively rotatable elements, one of which is in the form of a shaft, said seal comprising in combination a washer adapted to surround the shaft and having a forwardly disposed radial sealing surface and a generally cylindrical outer surface, a deformable sleeve of elastomeric material, said sleeve having a radially inwardly disposed flange at one end, a substantially cylindrical region at its other end, and an inwardly deformable intermediate region adapted to accommodate relative axial movement between the ends of the sleeve, means for compressing the cylindrical region of the sleeve inwardly against the outer cylindrical surface of the washer to form a fluid-tight connection therebetween, a retainer adapted to surround said shaft and having a cylindrical wall extending into said washer and serving to support the same and a radial wall disposed rearwardly of said washer and against which at least a portion of said inwardly disposed flange bears, said inwardly disposed flange having formed at its inner end an enlarged re-entrant portion immediately surrounding the cylindrical wall of the retainer, a coil spring disposed within the sleeve and compressed between said flange on the sleeve and the washer, and a confining ring disposed within the sleeve and having a portion surrounding said re-entrant portion and serving to preload the latter upon the cylindrical wall of the retainer, said confining ring having a portion surrounding said spring and extending forwardly therealong within the inwardly deformable intermediate region of the sleeve to prevent inward deformation of said latter portion of the sleeve and consequent contact of the latter with said coil spring.

2. A seal for relatively rotatable elements comprising in combination a washer having a generally cylindrical outer surface, a deformable sleeve of elastomeric material, said sleeve having a radially inwardly disposed flange at one end, a substantially cylindrical region at its other end, and a deformable intermediate region adapted to accommodate relative axial movement between the ends of the sleeve, means for compressing the cylindrical region of the sleeve inwardly against the outer cylindrical surface of the washer to form a fluid-tight connection therebetween, a retainer having a cylindrical wall and a radial wall disposed rearwardly of said washer and against which at least a portion of said inwardly disposed flange bears, means on said retainer and washer establishing a driving connection therebetween, a compression spring effectively bearing at one end against said inwardly disposed flange of the sleeve and its other end against said washer, and a thrust ring disposed within said sleeve and having a cylindrical wall surrounding said compression spring, said thrust ring bearing at one end against said inwardly disposed flange of the sleeve and extending forwardly within the sleeve a distance greater than the length of said spring when the latter is compressed to a solid state said inwardly disposed flange being formed at its inner end with an enlarged re-entrant portion immediately surrounding the cylindrical wall of the retainer, and said cylindrical portion of the thrust ring also surrounding the re-entrant portion and serving to compress the latter upon the cylindrical wall of the retainer.

References Cited in the file of this patent

UNITED STATES PATENTS

| | | |
|---|---|---|
| 2,403,298 | Payne | July 2, 1946 |
| 2,474,123 | Schmitz | June 21, 1949 |
| 2,599,034 | Wilkinson | June 3, 1952 |
| 2,610,871 | Woodson | Sept. 16, 1952 |
| 2,645,508 | Payne | July 14, 1953 |
| 2,650,841 | Meyer | Sept. 1, 1953 |
| 2,671,407 | Higbie | Mar. 9, 1954 |
| 2,703,371 | Wightman | Mar. 1, 1955 |

FOREIGN PATENTS

| | | |
|---|---|---|
| 430,173 | Great Britain | June 14, 1935 |